United States Patent [19]

Chmela et al.

[11] Patent Number: 4,492,194
[45] Date of Patent: Jan. 8, 1985

[54] SPARK-IGNITION AIR-COMPRESSING INTERNAL COMBUSTION ENGINE

[75] Inventors: Franz Chmela, Nuremberg; Walter Herzog, Katzwang; Richard Meier, Stein, all of Fed. Rep. of Germany

[73] Assignee: M.A.N. Maschinenfabrik, Nuremberg, Fed. Rep. of Germany

[21] Appl. No.: 560,154

[22] Filed: Dec. 12, 1983

[30] Foreign Application Priority Data

Dec. 12, 1982 [DE] Fed. Rep. of Germany ....... 3245780

[51] Int. Cl.³ .............................................. F02B 3/00
[52] U.S. Cl. .................................................. 123/276
[58] Field of Search .......................................... 123/276

[56] References Cited

U.S. PATENT DOCUMENTS

| | | | |
|---|---|---|---|
| 2,942,591 | 6/1960 | Meuren | 123/276 |
| 3,534,714 | 10/1970 | Urlaub | 123/276 |
| 3,814,066 | 6/1974 | Lohr | 123/276 |
| 4,278,057 | 7/1981 | Urlaub | 123/276 |
| 4,294,206 | 10/1981 | Urlaub | 123/276 |

Primary Examiner—Ronald B. Cox
Attorney, Agent, or Firm—Felfe & Lynch

[57] ABSTRACT

A spark-ignition, air-compressing internal combustion engine has a combustion chamber in a piston movable toward a cylinder head of the engine. Fuel is injected onto the wall of the combustion chamber and air rotated in the chamber to remove the fuel from the combustion chamber wall gradually as a vapor. The cross-section of the combustion chamber wall is defined by two curved lines of specific radial relation generally indicated by the curved line extending from the opening into the combustion chamber having the smaller radius of curvature.

14 Claims, 2 Drawing Figures

SPARK-IGNITION AIR-COMPRESSING INTERNAL COMBUSTION ENGINE

This invention relates to a spark-ignition air-compressing internal combustion engine with direct injection of the fuel by means of a jet depositing the major proportion of the fuel on the wall of the combustion chamber having the shape of a solid of revolution and arranged in the piston where such rotary motion is imparted to the inflowing air by means known per se in the direction of the injected fuel jet that the fuel is gradually removed in the vapour state from the combustion chamber wall to be mixed with the air, the injection nozzle is located in the cylinder head near the edge of the combustion chamber and the ignition device arranged opposite the injection nozzle penetrates into the combustion chamber in the top dead centre position of the piston.

An internal combustion engine of this type was disclosed by the German Patent Specification No. 1,576,020.

In the case of internal combustion engines where the mixture formation is predominantly effected by deposition of the fuel on the combustion chamber walls, the air motion in the combustion chamber is of two-fold importance; firstly, it has to bring about a sufficiently fast and effective removal of the fuel deposited on the combustion chamber wall and, secondly, produce subsequent mixing of the fuel with the air. The air motion is generated by two features: by the above-mentioned rotation of the air for combustion about the longitudinal axis of the combustion chamber which is initiated during the induction stroke and by the squish flow developing as the air flows into the combustion chamber (during the compression stroke). Obviously, the rotation of the air symmetrically about the axis of the combustion chamber is specially suitable for removing the fuel sprayed onto the wall. This rotation permits high velocities and long duration of the air motion because it is not halted by the combustion process and the movement of the gases due to expansion. On the other hand, too intense a squish flow and its effect have proved to be disadvantageous. Since the velocity of the squish flow and, consequently, its component of the resultant swirl flow directed near the wall towards the combustion chamber opening tends to increase more rapidly as the piston approaches the top dead centre than the velocity of the pure swirl flow accelerated by the movement of the charge into the combustion chamber in the piston and, consequently, its tangential component in a horizontal reference plane, the direction of the resultant flow near the wall tends to vary widely versus the piston stroke. In the case of spark-ignition internal combustion engines, this poses a problem in as much as the task to maintain the fuel vapour concentration in the spark gap during the sparkovers within the ignition limits, because it is necessary not only to ensure the coincidence of mixture supply and sparkovers with respect to time but also with respect to location. Where the injection nozzle and the ignition device are arranged opposite each other the designer is confronted with the need to have the electrode, or electrodes, penetrate relatively deeply into the combustion chamber so that the flashing spark can choose the point where the most favourable mixture exists. In addition, there have been proposals to provide a weir on the combustion chamber wall in the region of the electrode(s) or to channel the fuel film by means of an entrant groove whereby a certain amount of fuel accummulation is achieved (in the region of the electrodes).

Due to the cyclonic action of the swirl flow which maintains the fuel exaporating from the film on the wall in a zone adjacent to the combustion chamber wall in the vicinity of the combustion chamber equator, it is general practice and necessary to locate the spark gap of the electrodes in just this region. In the case of the broadly spherical combustion chamber used hitherto, this resulted in electrode lengths between 20 and 25 mm depending on the physical design of the engine.

However, such a length of the electrodes involves some serious disadvantages for the reliability and life of the electrodes. First of all, there is the danger of the electrodes breaking due to transient thermal stresses and vibrations induced by the fluid flow which, in view of the small clearance between the piston crown and the cylinder head is liable to cause damage to the working surface of the pistons and ultimately to destruction of the engine. Another disadvantage of the great electrode length is in the fact that deformation may arise due to the effect of the temperatures which makes it impossible to maintain the narrow electrode gap of 0.1 to 0.5 mm which is required on account of the high compression. Due to the unfavourable ratio of cross-sectional area to the surface of long electrodes and the relatively high ignition energy required by reason of the uncertainties in the mixture supply (caused by variation in the flow), high burn-up rates are also encountered which unnecessarily abbreviate the service intervals of a vehicle.

It is also disadvantageous to provide a weir or entrant channel in the combustion chamber wall because such features involving additional machining increase the costs of the piston. Moreover, the effectiveness of such features is limited or even nullified where the engine is operated with fuel that is not absolutely clean over an extended period of time, because the contaminants are precipitated onto the combustion chamber wall forming deposits of increasing thickness which change the shape of the weir or entrant channel to an extent that reliable ignition is no longer warranted.

In view of the high compression ratios from 16 to 18 required and adopted in practice in respect of internal efficiency and exhaust gas quality and the relatively small combustion chamber diameters resulting, the spark plug in the state of the art referred to initially was generally arranged eccentrically, since the spark plug is located at a certain distance from the centre of the cylinder because of the valve, whereas the stratified-charge principle calls for it to be situated at the periphery of the combustion chamber. The relatively small combustion chamber diameter and offsetting the combustion chamber towards the spark plug necessitate a specially long nozzle entrant section which is liable to interfere with the air swirl and associated with this, difficulties to achieve ignition may result.

The relatively small combustion chamber diameter or, to be more exact, the relatively small diameter of the combustion chamber opening, involves another drawback inasmuch as the pronounced squish flow occurring together with the relatively long flow paths down to the piston rings which act as heat sink lead to high thermal stresses at the edge of the combustion chamber.

The valve bridge, too, is subjected to increased heat exposure due to the squish flow.

It is the object of the present invention to mitigate or totally remove the weak spots explained and their detrimental effects, the aims being in an internal combustion engine of the type initially described to equalize the widely variable flow in the vicinity of the wall, to lower the wear of the ignition device and to achieve an absolutely reliable ignition and optimum combustion of the prepared mixture and, consequently, the best possible engine performance in all operating ranges without any appreciable extra design complexity.

According to the invention, this object is achieved in that the side wall of the combustion chamber—seen in cross section—is formed by two curved lines, one blending into the other, the first curved line with the smaller radius of curvature extending from a constricted combustion chamber opening to the maximum combustion chamber diameter and the second curved line with the greater radius of curvature extending to or blending into the substantially flat combustion chamber bottom. Preferably, the maximum combustion chamber diameter is 0.5–0.7 times the piston diameter and—starting from the piston crown—is at a depth which corresponds to 0.3 to 0.4 times the combustion chamber depth, and that the smaller radius curvature of the combustion chamber side wall has a length of 0.2 to 0.3 $T_B$, the greater radius of curvature having a length of 0.5 to 0.75 $T_B$, the ratio of the combustion chamber opening diameter to the maximum combustion chamber diameter being between 0.85 and 0.95 and the height of the wall of the combustion chamber opening being between 0.1 and 0.15 $T_B$.

The combustion chamber shape proposed by the invention enables the following objectives to the achieved: due to the pronounced curvature of the combustion chamber side walls in the area of the maximum diameter, the fuel vapour is more intensely concentrated in a certain zone than hitherto. This zone is situated near the combustion chamber opening; as a result, satisfactory supply with an ignitable mixture is ensured even with short electrodes. Therefore, the screw-type spark plugs hitherto used with several rod electrodes can be drastically shortened, whereby penetration lengths (at top dead centre of the piston) of under 12 mm are obtained and even the customary spark plugs with hook-type electrodes as used in passenger car type Otto cycle engines can be employed. Even the use of a glow plug is not impossible.

Due to the increase in the maximum combustion chamber diameter or, respectively, in the diameter of the combustion chamber opening (in relation to the depth of the combustion chamber), the remaining piston crown area and, consequently, the radial path length which is important for the generation of the squish flow are reduced. Apart from the associated steadying of the flow near the wall, the reduction of the squish flow velocity also causes the thermal stressing of the combustion chamber opening which, obviously, is also reduced due to the now shorter distance to the piston ring area as well as that of the valve bridge to be lowered. The increase in the combustion chamber diameter also offers an advantage in that the air utilization is improved because the proportion of the fresh air between the piston crown and the cylinder head which, as a matter of experience, participates incompletely in the combustion, is reduced. Finally, as the combustion chamber is increased, the side of the combustion chamber opening opposite the spark plug is brought closer to the injection nozzle whereby the entrant section in the piston is shortened or can be omitted altogether.

Due to the greater concentration of the vapour/air mixture in the region of the greater combustion chamber diameter, troublefree supply with an ignitable mixture for the spark gap existing there is facilitated which eliminates the need for the use of, for instance, an entrant channel to guide liquid fuel to a point ahead of the spark gap. The resultant improvement in peripheral charge stratification also permits a reduction of the required ignition energy because a higher local fuel vapour concentration is achieved locally which, in fact, is proportional to the ionisation voltage and also to the spark duration.

As mentioned initially, only short electrodes are required due to the small distance of the maximum combustion chamber diameter from the combustion chamber opening. These short electrodes offer the advantage of a longer useful life because they are at a lower temperature level, last but not least because of the now existing reduced air motion. This fact also makes it possible for the compression ratio to be raised further, i.e. above the present figure of 18, without the penalty of unaccessibly high burn-up rates due to the associated temperature and pressure levels in the cylinder and, consequently, the thermal exposure of the spark electrodes.

The use of the proposed combustion chamber is particularly favourable for the case of a spark ignition engine considered here because those fuels which conveniently call for spark ignition (for instance, methanol) have a lower boiling point and boiling characteristic than Diesel fuel and, as a result, the slow-down of the air swirl in the region of the maximum combustion chamber diameter compared to a spherical combustion chamber with a very much smaller diameter is compensated as far as its effects on the rate of mixture formation are concerned. However, even engines operated on Diesel fuel can benefit from the combustion chamber design according to the invention in order to avoid, for instance, the disadvantages of a long entrant recess for the injection nozzle or high temperature stresses encountered with a spheroidal combustion chamber shape in line with existing practice.

As a further development of the invention, it is advantageous to form the middle part of the combustion chamber bottom—in a manner known per se—as a dome-shaped protuberance. As a result, the air otherwise existing there (with a flat configuration of the combustion chamber bottom) is brought closer to the combustion originating from the wall.

Due to the shallower depth of the combustion chamber or, in other words, due to the greater combustion chamber diameter or, respectively, the greater diameter of the combustion chamber opening, the fuel jet has to be injected at a lesser angle. In a plane perpendicular to the cylinder axis, the fuel jet forms an angle of 10° to 15° in a plane perpendicular to the cylinder axis. The injection takes place in a manner (start of injection at full load is approx. 30° crank angle before top dead centre) that, on the one hand, no fuel will be deposited on the piston crown at the start of injection and, on the other hand, the point of impingement of the fuel jet on the combustion chamber wall in the top dead centre position of the piston is situated not at too low a level in the lower region of the combustion chamber, in other words, that it is not too great a distance below the maximum combustion chamber diameter. It has proved to be advantageous for the point of impingement of the fuel jet on the combustion chamber wall (in top dead centre position of the piston) is situated at a distance (a) of 40 to 60% of the combustion chamber depth below the piston crown.

Seen in the direction of the air rotation—the geometric fuel jet impinges on the combustion chamber wall at a point ahead of the ignition device penetrating into the combustion chamber. In order to reliably obtain a well ignitable mixture or, respectively, to cause the point of fuel jet impingement to be close enough to the electrode zone, it has proved to be expedient for the sector angle between the fuel jet impingement point and the centre of the ignition device to amount to between 15° and 45°, projected into a plane lying perpendicular to the combustion chamber longitudinal axis.

A typical embodiment of the invention is described in greater detail in the following:

Figure 1:
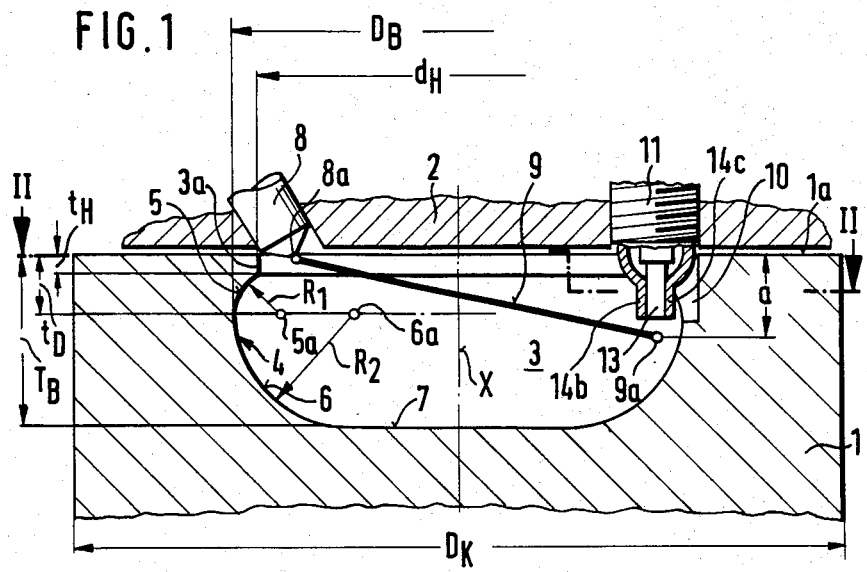
FIG. 1 is a longitudinal section along the line I—I in FIG. 2 through the top part of the piston with a combustion chamber and a fuel jet according to the invention.

The figures show a combustion chamber 3 with a constricted combustion chamber opening 3a arranged centrally in the bottom 1a of a piston 1. The liquid fuel is injected by a nozzle 8, which is not illustrated and arranged off-centre in the cylinder head 2 by means of only one jet 9 into the combustion chamber 3 in the direction of the rotating air for combustion 12, the timing being selected to suit the specific operating conditions and the specific type of fuel (boiling point and ignition quality). The point where the fuel jet impinges on the combustion chamber wall 4 when the piston is at top dead centre is below the maximum combustion chamber diameter $D_B$ and designated by the numeral 9a. The fuel discharge point 8a of the injection nozzle 8 is located near the edge of the combustion chamber opening.

At a point opposite the fuel discharge point 8a there is a recess 10 formed in the piston crown 1a or, respectively, the combustion chamber wall 4 into which penetrates an ignition device 11, which is also arranged in the cylinder head 2, when the piston 1 is positioned at its top dead centre. The ignition device may, for instance, consist of several rod electrodes; in the case illustrated, it consists of a central electrode 13 and three individual electrodes 14a, 14b, 14c arranged around this central electrode 13. However, the ignition device may also take the form of a spark plug with hook-type electrodes as commonly used in passenger car Otto-cycle engines. The use of a glow plug may also be considered.

According to the invention, the side wall 4 of the combustion chamber 3 is formed by two curved lines 5, 6 which blend into each other, the first curved line 5 with the smaller radius of curvature $R_1$ extending from the constricted combustion chamber opening 3a down to the maximum combustion chamber diameter $D_B$ and the second curved line 6 with the greater radius of curvature $R_2$ extending down to and blending into the substantially flat combustion chamber bottom 7; the combustion chamber bottom 7 may be formed with a dome-shaped protuberance at its centre. The maximum combustion chamber diameter $D_B$ in whose horizontal plane are also located the centres 5a, 6a of the curved lines 5, 6, amounts to 0.5 to 0.7 times the piston diameter $D_K$ and, measuring from the piston crown 1a, is situated at a depth $t_D$ which corresponds to 0.3 to 0.4 times the combustion chamber depth $T_B$. The smaller radius of curvature $R_1$ of the combustion chamber side wall 4 has a length of 0.2 to 0.3 $T_B$, the greater radius of curvature $R_2$ having a length of 0.5 to 0.75 $T_B$. Finally, the diameter $d_H$ of the constricted combustion chamber opening 3a is between 0.85 and 0.95 $D_B$, the wall height of this opening being between 0.1 and 0.15 $T_B$.

The point of impingement 9a of the fuel jet 9 on the combustion chamber wall 4 at the top dead centre position of the piston 1 is at a distance(a) of 40 to 60% of the combustion chamber depth below the piston crown 1a. Projected onto a plane lying perpendicular to the combustion chamber axis x, the point of impingement forms a sector angle $\alpha$ of 15° to 45° with the centre of the central electrode 13 of the ignition device 11.

Figure 2:
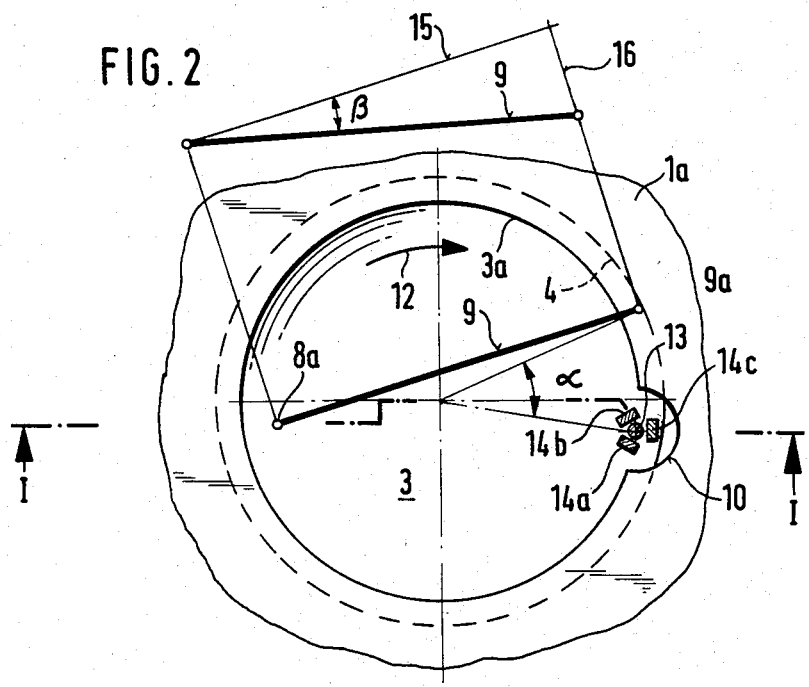
FIG. 2 is a plan view of a piston along the line II—II in FIG. 1.

FIG. 2 shows in a side elevation the actual magnitude of the angle $\beta$ which the fuel jet 9 forms with a plane perpendicular to the cylinder axis x, the straight line 15 representing the plane perpendicular to the cylinder axis x and the length 16 representing the distance from the fuel jet discharge point 8a to the fuel impingement point 9a in the direction of the cylinder axis x.

As can be also seen from FIG. 2, it is not necessary for physical design reasons to have the fuel jet discharge point 8a and the ignition device arranged absolutely diametrically opposite each other, but point 8a may be somewhat offset against the combustion chamber centre (piston centre). It would also be possible to arrange the combustion chamber itself somewhat off centre if, also for physical design reasons, the distance of the ignition device from the cylinder centre has to be somewhat larger for some reason or other than with a centrally arranged combustion chamber. In the case illustrated, it would still be possible to omit an entrant section because of the greater combustion chamber diameter.

It will be understood that the specification and examples are illustrative but not limitative of the present invention and that other embodiments within the spirit and scope of the invention will suggest themselves to those skilled in the art.

We claim:

1. Spark-ignition, air-compressing internal combustion engine, comprising: a cylinder head on the engine, an ignition device on the cylinder head; a piston movable in the engine toward the cylinder head; a combustion chamber in the piston; injection nozzle means for direct injection of fuel by a jet applying the major portion of the fuel onto the wall of the combustion chamber, the wall being in the shape of a solid of revolution; means for imparting such a rotary motion in the direction of the injected fuel jet to air flowing into the combustion chamber that the fuel is gradually removed in a vapor state from the combustion chamber wall and mixed with the air, the injection nozzle means being situated in the cylinder head near the edge of the combustion chamber and the ignition device being arranged opposite the injection nozzle and projecting into the combustion chamber in the top, dead-center position of the movement of the piston toward the cylinder head, the side wall (4) of the combustion chamber (3)—seen in cross section—being formed by two curved lines (5, 6) which blend into each other, a first (5) of the curved lines having the smaller radius of curvature ($R_1$) and extending from a constricted combustion chamber opening (3a) down to the maximum combustion chamber diameter ($D_B$) and the second curved line (6) having the greater radius of curvature ($R_2$) and extending down to and blending into a substantially-flat combustion chamber bottom (7), the maximum combustion chamber diameter ($D_B$) amounting to 0.5 to 0.7 times the piston diameter ($D_K$) and—measuring from the piston crown (1a)—located at a depth ($t_D$) which corresponds to 0.3 to 0.4 times the combustion chamber depth ($T_B$), and the smaller radius of curvature ($R_1$) of the combustion chamber side wall (4) having a length of 0.2 to 0.3 $T_B$, the greater radius of curvature ($R_2$) having a length of 0.5 to 0.75 $T_B$, the ratio of the combustion chamber opening diameter ($d_H$) to the maximum combustion chamber diameter ($T_B$) being between 0.85 and 0.95 and the wall height ($t_H$) of the combustion chamber opening (3a) being between 0.1 and 0.15 $T_B$.

2. Spark-ignition air-compressing internal combustion engine as in claim 1, characterized in that the central part of the combustion chamber bottom (7) is formed as a dome-shaped protuberance.

3. Spark-ignition air-compressing internal combustion engine as in claim 1, characterized in that the fuel jet (9) forms an angle ($\beta$) of 10° to 15° with a plane situated perpendicular to the cylinder axis (x), the point of impingement (9a) of the geometric fuel jet (9) on the combustion chamber wall (4) in the top dead centre position of the piston (1) is at a distance (a) of 40 to 60% of the combustion chamber depth ($T_B$) below the piston crown (1a).

4. Spark-ignition air-compressing internal combustion engine as in claim 1, characterized in that the sector angle ($\alpha$) between the fuel jet impingement point (9a) and the center of the ignition device (11)—projected onto a plane extending perpendicular to the combustion chamber longitudinal axis (x)—is between 15° and 45°.

5. Spark-ignition air-compressing internal combustion engine as in claim 1, characterized in that the ignition device consists of rod electrodes extending parallel with each other.

6. Spark-ignition air-compressing internal combustion engine as in claim 5, characterized in that the rod electrode (14) forming the one pole of the ignition device consists of a plurality of part electrodes (14a, 14b, 14c) arranged around the rod electrode (13) forming the other pole.

7. Spark-ignition air-compressing internal combustion engine as in claim 1, characterized in that the ignition device consists of a spark plug with one or a plurality of hook electrodes.

8. Spark-ignition air-compressing internal combustion engine as in claim 1, characterized in that the ignition device is formed as a glow plug.

9. Spark-ignition air-compressing internal combustion engine as in claim 1, characterized in that the length of the projection of the ignition device into the combustion chamber (3) in the top, dead-centre position of the piston (1) is less than 12 mm.

10. Spark-ignition air-compressing internal combustion engine as in claim 5, characterized in that the sector angle ($\alpha$) between the fuel jet impingement point (9a) and the center of the ignition device (11)—projected onto a plane extending perpendicular to the combustion chamber longitudinal axis (x)—is between 15° and 45°.

11. Spark-ignition air-compressing internal combustion engine as in claim 6, characterized in that the sector angle ($\alpha$) between the fuel jet impingement point (9a) and the center of the ignition device (11)—projected onto a plane extending perpendicular to the combustion chamber longitudinal axis (x)—is between 15° and 45°.

12. Spark-ignition air-compressing internal combustion engine as in claim 7, characterized in that the sector angle ($\alpha$) between the fuel jet impingement point (9a) and the center of the ignition device (11)—projected onto a plane extending perpendicular to the combustion chamber longitudinal axis (x)—is between 15° and 45°.

13. Spark-ignition air-compressing internal combustion engine as in claim 8, characterized in that the sector angle ($\alpha$) between the fuel jet impingement point (9a) and the center of the ignition device (11)—projected onto a plane extending perpendicular to the combustion chamber longitudinal axis (x)—is between 15° and 45°.

14. Spark-ignition air-compressing internal combustion engine as in claim 9, characterized in that the sector angle ($\alpha$) between the fuel jet impingement point (9a) and the center of the ignition device (11)—projected onto a plane extending perpendicular to the combustion chamber longitudinal axis (x)—is between 15° and 45°.

* * * * *